CARDIAC ACTIVE ACYL CYMAROLS
Samuel Wilkinson, London, England, assignor to Burroughs, Wellcome & Co. (U.S.A.), Inc., Tuckahoe, N.Y.
No Drawing. Filed Sept. 24, 1963, Ser. No. 311,207
Claims priority, application Great Britain Oct. 4, 1962, 37,529/62; Aug. 16, 1963, 32,511/63, 32,512/63
18 Claims. (Cl. 167—65)

This invention relates to steroids, particularly derivatives of the 5β-card-20(22)-enolide system whose structure is shown below.

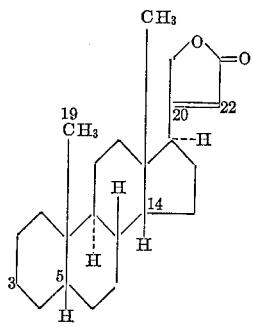

This structure occurs in the cardiac glycosides obtained from Strophanthus spp. and Digitalis spp., several of which have been used in medicine and are generally given by mouth.

For example, the glycoside digoxin (from *Digitalis lanata*), 3α-tri-(β-D-digitoxosyl)oxy-12α,14-dihydroxy-5β-card-20(22)-enolide, has found extensive use in cardiac insufficiency, and is believed to act on the myocardial fibres. The observable changes which take place are an increase in the force of systolic contraction, a decrease in heart rate, a decrease in diastolic size, and an increased cardiac output. The effect of the drug on the heart is indicated by changes in the pattern of waves shown in the electrocardiogram: bradycardia, an increase of the QRS potential, and a depression of the ST segment. In toxic doses, digoxin causes emesis and eventually death through heart block. Although digoxin is very potent, it is also quite toxic, and in some cases of advanced congestive heart failure, for example, the dose required for therapy is close to the toxic dose.

Other cardiac glycosides have similar effects on the heart, and the potency often runs parallel with the toxicity. One of these is cymarol, 3β-β-D-cymarosyloxy-5,14,19-trihydroxy-5β-card-20(22)-enolide, which has the same type of effect as digoxin on the failing heart but unlike digoxin it has a low potency when administered orally and has found little use in clinical medicine. Cymarol may be obtained from Strophanthus spp. (for example *S. kombe*, *S. nicholsonii* and *S. ledienii*) either directly or by reduction of the corresponding aldehyde cymarin, 3β-β-D-cymarosyloxy-5,14-dihydroxy-19-oxo-5β-card-20(22)-enolide, which often occurs in larger amounts.

It has now been found in pharmacological experiments that certain diesters of cymarol have greater potency than cymarol when given orally, and in particular the diacylcymarols of Formula I can restore the failing heart at a smaller proportion of the oral lethal dose than is the case with either digoxin or cymarol.

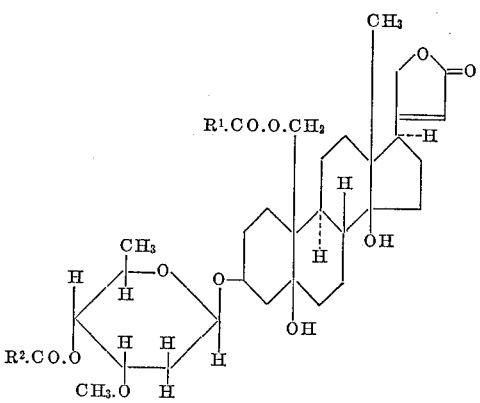

(I)

In this formula $R^1$ is a hydrogen atom or an aliphatic radical having from 1 to 3 carbon atoms and $R^2$ is an aliphatic radical having 1 to 3 carbon atoms.

The superior therapeutic properties of the diacylcymarols of Formula I are illustrated by experimental results shown in the following tables.

Table 1 shows the minimum doses (mg./kg. body weight) of digoxin, cymarol, and diacetylcymarol (Formula I: $R^1=R^2=$methyl) required to produce a digitalis-like effect and to cause death when given via the ileum to anaesthetised dogs. The digitalis-like effect is indicated by a depression of the ST segment of the electrocardiogram.

TABLE 1.—DIGITALIS-LIKE EFFECT AND DEATH IN THE DOG

|  | Digoxin | Cymarol | Diacetyl-cymarol |
|---|---|---|---|
| Depression of the ST segment | 0.7 | 0.2–0.4 | 1.0 |
| Death | 1.4 | 1.4 | 15 |

In this experiment, the observed therapeutic index (lethal dose/effective dose) was 2 for digoxin, 3.5–7 for cymarol and 15 for diacetylcymarol.

An early indication of the digitalis-like action is displayed by a decrease in the QT interval of the electrocardiogram of a cat treated orally with diacetylcymarol.

Table 2 shows the minimum doses (mg./kg. body weight) of these compounds and dipropionylcymarol (Formula I: $R^1=R^2=$ethyl) required to causes emesis when given orally to the conscious dog (emesis is one of the initial toxic effects of cardiac glycosides).

TABLE 2.—EMESIS IN THE DOG

| Digoxin | Cymarol | Diacetyl-cymarol | Dipropionyl-cymarol |
|---|---|---|---|
| 2.0 | 2.0 | 16 | 32 |

Table 3 shows the doses of diacylcymarols of Formula I having cardiac activity in the guinea pig. This was measured by giving the drugs as suspensions in 20% w./v. gum acacia solution via the duodenum, monitoring the animals by means of the electrocardiogram, and determining the dose (mg./kg.) having a lethal effect on half the animals in a group ($LD_{50}$).

TABLE 3.—CARDIAC ACTIVITY IN THE GUINEA PIG

| Drug | $R^1$ | $R^2$ | $LD_{50}$ |
| --- | --- | --- | --- |
| Cymarol | | | 20 |
| Diformylcymarol | H | H | 1–5 |
| Diacetylcymarol | $CH_3$ | $CH_3$ | 4 |
| Dipropionylcymarol | $C_2H_5$ | $C_2H_5$ | 2–5 |
| Dibutyrylcymarol | $n$-$C_3H_7$ | $n$-$C_3H_7$ | 5–10 |

According to the invention in one aspect, therefore, there is provided a process for the treatment of cardiac insufficiency which comprises the administration of a diacylcymarol of Formula I in non-toxic dosage. In this way a diacylcymarol of Formula I may be used, for example, in cases of congestive heart failure, atrial fibrillation, atrial flutter, and paroxysmal tachycardia. As is generally the case with therapeutically useful cardiac glycosides, the diacylcymarols of Formula I are best given by mouth except in unsual circumstances. The appropriate dosage depends on the nature and severity of the symptoms, and in fixing the dosage the larger oral therapeutic index of the diacylcymarols of Formula I is advantageous.

For use in the treatment of cardiac insufficiency, a diacylcymarol of Formula I is conveniently administered as a pharmaceutical preparation which comprises discrete units each containing the drug in the same predetermined amount. The drug is preferably formulated in orally administrable units such as tablets, capsules or cachets, rectally administrable units such as suppositories or parenterally administrable units incorporating a predetermined amount of the drug in sterile solution in a sealed container.

The drugs may also be given in other pharmaceutical preparations in association with a pharmaceutically acceptable carrier, for example in association with an orally administrable liquid carrier at a predetermined concentration.

The preparations of this invention may be made by any of the methods of pharmacy. Accessory ingredients may be included such as pharmaceutically acceptable diluents, solutes, buffers, flavouring, binding, dispersing, surface-active, thickening, lubricating and coating materials, preservatives, antioxidants, bacteriostats, suppository bases and any other acceptable excipients. Granules may be made by precompression or by moistening the powdered drug with a solution of a binder and drying the moist mass. Tablets may be prepared by compressing free-flowing granules, optionally mixed with one or more accessory ingredients, into products of uniform and predetermined size. The granulated or powdered drug, optionally mixed with the one or more accessory ingredients, may be converted into a solution or suspension by admixture with a solvent or suspending liquid, and the solution or suspension then sterilised if for parenteral use.

The compound diformylcymarol and some pharmacological experiments with it have been described in a recent publication [Arzneimittel-Forschung (February 1963), 13, 142–149], but according to this publication the "enterale Wirkungsquote" of diformylcymarol is the same as that of cymarol and no greater oral therapeutic activity would be expected. This publication appeared after British patent application 37,529/62, first describing the present invention, was filed on October 4, 1962; its conclusion with respect to diformylcymarol makes the discovery of the the therapeutic utiliy of the diacylcymarols of Formula I according to the present invention even more surprising.

According to the invention in another aspect, there is provided as a novel composition of matter a diacylcymarol of Formula I in which $R^1$ is a hydrogen atom or an aliphatic radical having from 1 to 3 carbon atoms and $R^2$ is an aliphatic radical having from 1 to 3 carbon atoms. These diacylcymarols of Formula I are made by acylating a 4'-monoacylcymarol of Formula II with an acylating agent of formula $R^1.CO.X$, or (when $R^1$ is to be the same as $R^2$) by acylating cymarol with an acylating agent of formula $R^2.CO.X$.

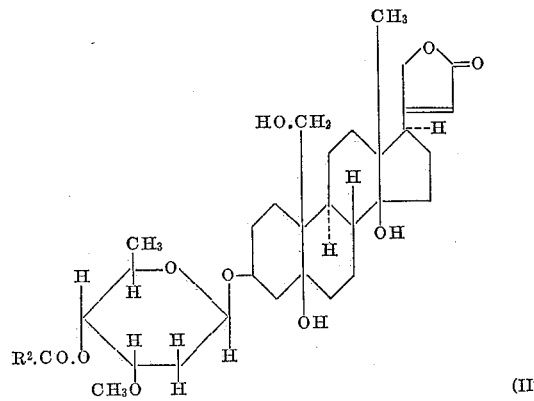

(II)

In these formulae, $R^1$ is a hydrogen atom or an aliphatic radical having from 1 to 3 carbon atoms, $R^2$ is an aliphatic radical having from 1 to 3 carbon atoms, and X is a proton-accepting radical.

Useful acylating agents include the acid anhydrides and acyl chlorides. Because the acyl groups in the diacylcymarol produced are readily split off under strongly acid or strongly alkaline conditions, the reaction is preferably carried out in solution in an organic base such as pyridine or dimethylformamide between about 10° C. and about 45° C. When an acid anhydride is used as the acylating agent, the organic base may be replaced as solvent by a solution of a metallic salt of the corresponding acid in the anhydride.

Formylation of a 4-monoacylcymarol of Formula II may be achieved with a mixture of formic acid, sodium formate and acetic anhydride in a basic solvent, for example dioxan or pyridine.

According to the invention in another aspect, there is provided as a novel composition of matter a 4'-monoacylcymarol of Formula II as defined above. These 4'-monoacylcymarols are not only useful intermediates for making diacylcymarols but also have cardiac activity in pharmacological tests conducted with standard experimental animals. They may be made by reduction of the corresponding 4'-monoacylcymarin compounds using a reducing agent capable of the selective reduction of the C(19) aldehyde group of the 4'-monacylcymarin. For example sodium borohydride or an amalgam of sodium or aluminium in a water-containing solvent may be used. The reduction may also be achieved by the Meerwein-Ponndorf-Verley method using aluminium isopropoxide is isopropanol. The 4-monoacylcymarol produced may be extracted by a solvent such as chloroform and purified by chromatography.

The 4'-monoacylcymarin starting materials may be made by acylating cymarin with an acylating agent of formula $R^2.CO.X$ (in which X is a proton-accepting radical) in the manner described above for the production of diacylcymarols.

Since cymarin is often the most readily available starting material and can itself be selectively reduced to give cymarol, the diacylcymarols may effectively be produced from cymarin by successive reduction and acylation steps with or without an initial acylation step.

The following examples illustrate the invention. The Rf values were obtained, unless otherwise indicated, in a chromatographic system comprising a solvent of xylol/butanone (1/1; v./v.) saturated with formamide and Whatman No. 1 paper impregnated with 25% (v./v.) formamide in acetone. In this chromatographic system cymarol has Rf 0.33 and cymarin has Rf 0.6.

Example 1

Cymarol (5 g.) was dissolved in pyridine (20 ml.) and acetic anhydride (20 ml.) added. The solution was kept at room temperature (22° C.) for 48 hours and the excess reagents removed by distillation under reduced pressure at a temperature not greater than 40° C. On triturating with water, the residue solidified and was filtered, washed with water and dried in a vacuum desiccator over phosphorus pentoxide. The dry solid was dissolved in the minimum volume of methanol and ether added until the solution became cloudy. On cooling, 19-acetoxy-3β-4'-O-acetyl-β-D-cymarosyloxy-5,14-dihydroxy-5β-card-20(22)-enolide (synonym: diacetylcymarol), crystallised out as colourless prisms, M.P. 137° C.; Rƒ 0.84; $[\alpha]_D^{22}=44°$ (c.=1.4 in methanol). On analysis the crystals were found to contain 64.0% carbon, 8.1% hydrogen and 13.4% acetyl. Theoretical amounts are 64.4% carbon, 7.9% hydrogen and 13.6% acetyl.

Example 2

Cymarol (15 g.) was dissolved in pyridine (75 ml.) and propionic anhydride (75 ml.) added. After standing for 24 hours at ambient temperature (22° C.), the solution was concentrated under reduced pressure at a temperature of 45° C. to remove the pyridine. The residue formed was diluted with chloroform (40 ml.) and added slowly with stirring to light petroleum (1.5 litres). The precipitated gum was redissolved in chloroform (100 ml.) and added slowly to light petroleum (1.5 litres) when an amorphous white solid was obtained. The solid was filtered, washed with light petroleum and dried in vacuo.

On chromatography, the solid product gave a single spot Rƒ 0.89 (on Whatman No. 4 paper), and was identified as 5,14-dihydroxy-3β-4'-O-propionyl-β-D-cymarosyloxy-19-propionyloxy-5β-card-20(22)-enolide (synonym: dipropionylcymarol). On the usual Whatman No. 1 paper the product had Rƒ 0.90; $[\alpha]_{22}^{D}+43.4°$ (c.=1.5 in methanol).

Example 3

Cymarol (3 g.) was dissolved in pyridine (15 ml.) and redistilled n-butyric anhydride (15 ml.) slowly added with stirring. The solution, after standing at ambient temperature in the presence of nitrogen for 24 hours, was evaporated under reduced pressure to remove the pyridine. The concentrated solution was poured into light petroleum, the light petroleum was decanted, and the semi-solid residue, after triturating with more light petroleum, was dissolved in chloroform. The chloroform solution was washed with water, dried with anhydrous sodium sulphate and concentrated under reduced pressure to give as a white amorphous solid, 3β-4'-O-butyryl-β-D-cymarosyloxy-19-butyryloxy-5,14 - dihydroxy - 5β-card - 20(22)-enolide (synonym: dibutyrylcymarol), Rƒ 0.91; $[\alpha]_{22}^{D}+43.2°$ (c.=1.5 in methanol).

Example 4

Cymarin (10 g.) was dissolved in pyridine (66 ml.) and acetic anhydride (60 ml.) added. After standing at ambient temperature in the presence of nitrogen for 2 hours, the mixture was poured on to crushed ice; the solid was filtered, washed with water and recrystallized from aqueous methanol. Crystals of 3β-4'-O-acetyl-β-D-cymarosyloxy-5,14-dihydroxy-19-oxo - 5β - card - 20(22) - enolide (synonym: 4'-monoacetylcymarin) were obtained melting at 174–176°;Rƒ0.8;$[\alpha]_D^{22}=+45°$ (c.=1.0 in methanol).

4'-monoacetylcymarin (2.5 g.) was dissolved in 80% aqueous dioxan (20 ml.) and sodium borohydride (0.37 g.) in 75% aqueous dioxan (25 ml.) was added with stirring over a period of 1 hour. After stirring for an additional hour, the mixture was acidified to Congo red with 2 N-sulphuric acid and the dioxan was removed by evaporation under reduced pressure. The aqueous residue was extracted three times with chloroform and the combined extracts were washed with a little water, dried with anhydrous sodium sulphate and evaporated under reduced pressure. The product was purified by chromatography on alumina (deactivated with acetic acid) using chloroform/benzene (1:1 v./v.) as the developing solvent. The chromatographically pure product was twice recrystallised from aqueous methanol to give 3β-4'-O-acetyl-β-D-cymarosyloxy-5,14,19-trihydroxy-5β-card-20(22) - enolide (synonym: 4'-monoacetylcymarol) as fine needles, M.P. 172–173°;Rƒ 0.68; $[\alpha]_D^{26}+41.0°$ (c.=0.5 in methanol).

Example 5

In the manner described in Example 4, cymarin was acylated with propionic anhydride to give 5,14-dihydroxy-19-oxo-3β-4'-O-propionyl-β-D-cymarosyloxy-5β-card - 20(22)-enolide (synonym: 4'-monopropionylcymarin), M.P. 156° C; Rƒ 0.87; $[\alpha]_D^{23}=+49.8°$ (c.=1 in methanol). This was similarly reduced to give 5,14,19-trihydroxy-3β-4'-O-propionyl-β-D-cymarosyloxy-5β-card-20(22 - enolide (synonym: 4'-monopropionylcymarol), M.P. 162–164° C.; Rƒ 0.79; $[\alpha]_D^{23}=+40.3°$ (c.=1 in methanol).

Example 6

In the manner described in Example 4, cymarin was acylated with butyric anhydride to give 3β-4'-O-butyryl-β-D-cymarosyloxy-5,14-dihydroxy-19-oxo - 5β - card - 20 (22)-enolide (synonym: 4'-monobutyrylcymarin), M.P. 155° C.; Rƒ 0.91; $[\alpha]_D^{23}=+51.5°$ (c.=1 in methanol). This was similarly reduced to give 3β-4'-O-butyryl-β-D-cymarosyloxy-5,14,19-trihydroxy-5β-card-20(22) - enolid (synonym: 4'-monobutyrylcymarol), M.P. 141–143° C.; Rƒ 0.85; $[\alpha]_D^{23}=+42.7°$ (c.=1 in methanol).

Example 7

4'-monoacetylcymarol (2 g.) was dissolved in pyridine (10 ml.) and cooled in ice. Formic acid (15 ml.) was added slowly, followed immediately by acetic anhydride (10 ml.). The mixture was left at room temperature (about 22° C.) overnight and then poured into iced water. The gummy insoluble material was dissolved in chloroform. The solution was washed with water, dried over anhydrous sodium sulphate and concentrated to a small volume. The concentrated solution was added dropwise to light petroleum, and the resultant precipitate was filtered off, washed thoroughly with light petroleum, and dried to give 3β-4'-O-acetyl-β-D-cymarosyloxy-19-formyloxy-5,14-dihydroxy-5β-card-20(22)-enolide (synonym: 4'-acetyl-19-formylcymarol) as an amorphous powder, Rƒ 0.82; $[\alpha]_D^{23}=+36.8°$ (c.=1 in methanol).

Example 8

In the manner described in Example 1, 4'-monoacetylcymarol was acylated with acetic anhydride to give diacetylcymarol, identical with the product of Example 1.

Example 9

In the manner described in Example 2, 4'-monoacetylcymarol was acylated with propionic anhydride to give 3β-4'-O-acetyl-β-D-cymarosyloxy - 5,14 - dihydroxy - 19-propionyloxy-5β-card-20(22)-enolide (synonym: 4'-acetyl 19- propionylcymarol) as an amorphous powder, Rƒ 0.87; $[\alpha]_D^{23}=+40.4°$ (c.=1 in methanol).

Example 10

In the manner described in Example 3, 4'-monoacetylcymarol was acylated with butyric anhydride to give 3β-4'-O-acetyl-β-D-cymarosyloxy-19-butyryloxy - 5,14 - dihydroxy-5β-card-20(22)-enolide (synonym: 4'-acetyl-19-butyrylcymarol) as an amorphous powder, Rƒ 0.89; $[\alpha]_D^{23}=+42.3°$ (c.=1 in methanol).

Example 11

In the maner described in Example 3, 4'-monopropionylcymarol was formylated with formic acid and acetic anhydride to give 19-formyloxy-5,14-dihydroxy-3β-14'-O-propionyl-β-D-cymarosyloxy - 5β-card-20(22)-enolide (synonym: 4'-propionyl-19-formylcymarol) as an amorphous powder, $[\alpha]_D^{23} = +43.5°$ (c.=1 in methanol).

Example 12

In the manner described in Example 1, 4'-monopropionylcymarol was acylated with acetic anhydride to give 19-acetoxy - 5,14 - dihydroxy-3β-4'-O-propionyl-β-D-cymarosyloxy-5β-card-20(22)-enolide (synonym: 4'-propionyl-19-acetylcymarol) as an amorphous powder, Rf. 0.88; $[\alpha]_D^{23} = +46.1°$ (c.=1 in methanol).

Example 13

In the manner described in Example 3, 4'-monopropionylcymarol was acylated with butyric to give 19-butyryloxy-5,14-dihydroxy-3β-4'-O - propionyl-β - D-cymarosyloxy - 5β - card - 20(22)-enolide (synonym: 4'-propinoyl-19-butyrylcymarol) as an amorphous powder, Rf. 0.91; $[\alpha]_D^{23} = +44.1°$ (c.=1 in methanol).

Example 14

In the manner described in Example 1, 4'-monobutyrylcymarol was acylated with acetic anhydride to give 19-acetoxy-3β-4'-O-butyryl-β-D-cymarosyloxy - 5,14 - dihydroxy-5β-card-20(22)-enolide (synonym: 4'-butyryl-19-acetylcymarol) as an amorphous powder.

Example 15

A solution of diacetylcymarol (1 part) in ethanol was poured on to a mixture of lactose (500 parts) and potato starch (100 parts). The ingredients were mixed thoroughly and the powder was granulated with an aqueous 5% w./v. starch mucilage. The granules were sifted at aperture size 965μ, dried at 50° C., and again sifted at 965μ. Magnesium stearate (5 parts, sifted at 124μ) was mixed with the granules, and tablets each containing 0.1 mg. of diacetylcymarol were compressed from the mixture with a suitable tabletting die.

Tablets of the following drugs, each containing 0.1 mg. of the drug, were prepared similarly:

Dipropionylcymarol,
Dibutyrylcymarol,
4'-acetyl-19-formylcymarol,
4'-acetyl-19-propionylcymarol,
4'-acetyl-19-butyrylcymarol,
4'-propionyl-19-formylcymarol,
4'-propionyl-19-acetylcymarol,
4'-propionyl-19-butyrylcymarol,
4'-butyryl-19-acetylcymarol,
Dicrotonylcymarol.

Example 16

A solution of diacetylcymarol (10 g.) in 95% v./v. ethanol (10 litres) was mixed with propylene glycol (5 litres) and the mixture was added to a syrup made by dissolving sucrose (30 kg.) and sodium acetate (200 g.) in a solution of methyl p-hydroxybenzoate (100 g.) in water (30 litres). Lemon oil (50 ml.) and tartrazine (40 g.) were added, and the solution was made up to 100 litres with water to give an orally administrable solution having pH about 6 and containing 0.1 mg. of diacetylcymarol in 1.0 ml.

Orally administrable solutions of the following drugs, containing 0.1 mg. of drug in 1.0 ml. were prepared similarly:

Dipropionylcymarol,
Dibutyrylcymarol,
4'-acetyl-19-formylcymarol,
4'-acetyl-19-propionylcymarol,
4'-acetyl-19-butyrylcymarol,
4'-propionyl-19-formylcymarol,
4'-propionyl-19-acetylcymarol,
4'-propionyl-19-butyrylcymarol,
4'-butyryl-19-acetylcymarol,
Dicrotonylcymarol.

Example 17

Diacetylcymarol (200 mg.) was dissolved in propylene glycol (25 ml.) at room temperature and the solution was made up to 1000 ml. with water for injection. The solution was passed through a sintered glass filter to give a particle-free solution which was filled into ampoules (2 ml., in each) under an atmosphere of carbon dioxide. The ampoules were sealed, and the injectable solution contained therein was sterilised by heating in an autoclave at 115° C. for 30 minutes.

Ampoules containing injectable solutions of the following drugs, 0.2 mg. of drug in 2 ml. in each ampoule, were prepared similarly:

Dipropionylcymarol,
Dibutyrylcymarol,
4'-acetyl-19-formylcymarol,
4'-acetyl-19-propionylcymarol,
4'-acetyl-19-butyrylcymarol,
4'-propionyl-19-formylcymarol,
4'-propionyl-19-acetylcymarol,
4'-propionyl-19-butyrylcymarol,
4'-butyryl-19-acetylcymarol,
Dicrotonylcymarol.

Example 18

A sterile injectable solution of diacetylcymarol was made from the same ingredients as in Example 15 except ethanol (95% v./v.) was used in place of propylene glycol.

What I claim is:

1. A process for treating cardiac insufficiency which comprises administering in non-toxic dosage, a compound of the formula:

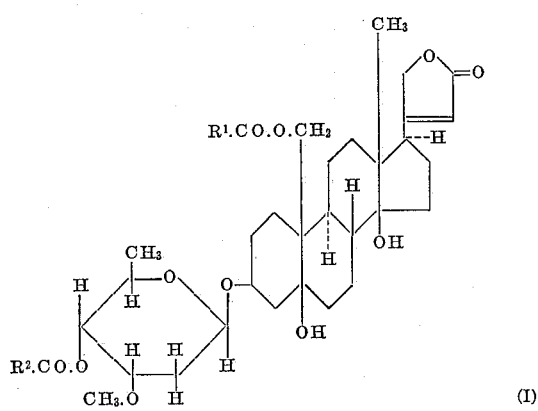

wherein $R^1$ is selected from the class consisting of a hydrogen atom and alkyl having from 1 to 3 carbon atoms and $R^2$ is selected from the class consisting of alkyl having from 1 to 3 carbon atoms.

2. A process according to claim 1, characterised in that in the diacylcymarol of Formula I administered, $R^1$ and $R^2$ are selected from the class consisting of methyl, ethyl and propyl.

3. A process according to claim 2, characterised in that the diacylcymarol administered is 4',19-diacetylcymarol.

4. A process according to claim 2, characterised in that the diacylcymarol administered is 4',19-dipropronylcymarol.

5. A cymarol ester selected from the class consisting of the 4',19-diacylcymarols of Formula I and the 4'-monoacylcymarols of Formula II:

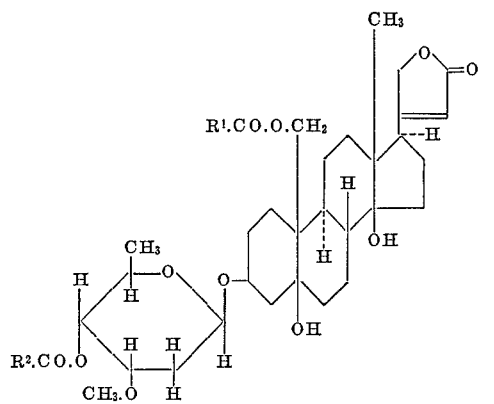

(I)

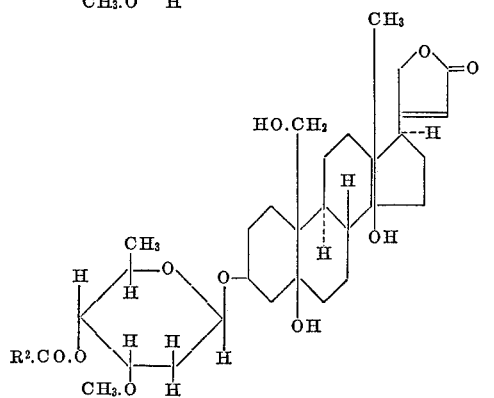

(II)

wherein $R^1$ is selected from the class consisting of hydrogen atom and alkyl having from 1 to 3 carbon atoms and $R^2$ is selected from the class consisting of alkyl having from 1 to 3 carbon atoms.

6. 4',19-diacetylcymarol.
7. 4',19-dipropionylcymarol.
8. 4',19-dibutyrylcymarol.
9. 4'-monoacetylcymarol.
10. 4'-monopropionylcymarol.
11. 4'-monobutyrylcymarol.
12. 4'-acetyl-19-formylcymarol.
13. 4'-acetyl-19-propionylcymarol.
14. 4'-acetyl-19-butyrylcymarol.
15. 4'-propionyl-19-formylcymarol.
16. 4'-propionyl-19-acetylcymarol.
17. 4'-propionyl-19-butyrylcymarol.
18. 4'-butyryl-19-acetylcymarol.

References Cited by the Examiner

UNITED STATES PATENTS 2,449,673  9/1948  Rosen _____ 260—210.5

OTHER REFERENCES

Helv. Chim. Acta, vol. 32, 1949, pp. 940–949.

Julsen et al.: Helv. Chim. Acta, vol. 45, No. 7, Dec. 1, 1962, pp. 2285–2296.

Kaiser et al.: Annalen der Chemie, vol. 643, 1961, pp. 192–200.

Rittel et al.: Helv. Chim. Acta, No. 68, 1953, pp. 554–558.

Turner: Helv. Chim. Acta, August 1948, pp. 20–23.

LEWIS GOTTS, *Primary Examiner.*

UNITED STATES PATENT OFFICE
CERTIFICATE OF CORRECTION

Patent No. 3,223,587              December 14, 1965

Samuel Wilkinson

It is hereby certified that error appears in the above numbered patent requiring correction and that the said Letters Patent should read as corrected below.

Column 7, line 4, for "-3β-14'-" read -- -3β-4'- --.

Signed and sealed this 29th day of November 1966.

(SEAL)
Attest:

ERNEST W. SWIDER              EDWARD J. BRENNER
Attesting Officer              Commissioner of Patents

Disclaimer

3,223,587.—*Samuel Wilkinson*, London, England. CARDIAC ACTIVE ACYL CYMAROLS. Patent dated Dec. 14, 1965. Disclaimer filed Nov. 19, 1971, by the assignee, *Burroughs Wellcome Co.*

Hereby enters this disclaimer to claims 5 and 6 of said patent.

[*Official Gazette March 7, 1972.*]